United States Patent
Abhyanker

(10) Patent No.: US 12,406,144 B2
(45) Date of Patent: Sep. 2, 2025

(54) LINGUISTIC ANALYSIS TO AUTOMATICALLY GENERATE A HYPOTHETICAL LIKELIHOOD OF CONFUSION OFFICE ACTION USING DUPONT FACTORS

(71) Applicant: Raj Abhyanker, Cupertino, CA (US)

(72) Inventor: Raj Abhyanker, Cupertino, CA (US)

(*) Notice: Subject to any disclaimer, the term of this patent is extended or adjusted under 35 U.S.C. 154(b) by 297 days.

(21) Appl. No.: 18/199,908

(22) Filed: May 19, 2023

(65) Prior Publication Data
US 2024/0386208 A1 Nov. 21, 2024

(51) Int. Cl.
*G06F 17/00* (2019.01)
*G06F 40/30* (2020.01)
*G06N 3/08* (2023.01)

(52) U.S. Cl.
CPC .............. *G06F 40/30* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 6,629,092 | B1 | 9/2003 | Berke |
| 7,444,589 | B2 | 10/2008 | Zellner |
| 7,478,091 | B2 | 1/2009 | Mojsilovic et al. |
| 7,587,308 | B2 | 9/2009 | Kasravi et al. |
| 7,792,858 | B2* | 9/2010 | Tang ................ G06F 16/3322 707/723 |

(Continued)

FOREIGN PATENT DOCUMENTS

| | | |
|---|---|---|
| CN | 1581159 A | 2/2005 |
| CN | 104809142 B | 3/2018 |

(Continued)

OTHER PUBLICATIONS

"Intelligent trademark similarity analysis of image, spelling, and phonetic features using machine learning methodologies", Published at Advanced Engineering Informatics, by Charles V. Trappey et al., Published Online on [Jun. 2, 2020] https://sci-hub.hkvisa.net/10.1016/j.aei.2020.101120.

(Continued)

*Primary Examiner* — Satwant K Singh
(74) *Attorney, Agent, or Firm* — LEGALFORCE RAPC WORLDWIDE

(57) ABSTRACT

Disclosed are a method and/or a system of linguistic analysis to automatically generate a hypothetical likelihood of confusion office action using Dupont factors. The method associates a first keyword formed with an alphanumeric string of characters in a first written script with a semantic meaning based on an analysis of the contextual relevancy of the first keyword affixed on an article of manufacture, a description of the article of manufacture, and a web page screenshot bearing the first keyword. The method compares the first keyword with a second keyword with a known semantic meaning as documented in a trusted authority and applying a linguistic artificial intelligence algorithm to determine which of a set of comparative rules form a basis of an arguable similarity. Further, the method automatically drafts a proposed argument in issue, rule, application, and conclusion format to support a position on the similarity between the semantic inference.

20 Claims, 6 Drawing Sheets

NETWORK VIEW 150

(56) References Cited

U.S. PATENT DOCUMENTS

| | | | |
|---|---|---|---|
| 8,600,736 B2 | 12/2013 | Ball | |
| 8,655,912 B2 * | 2/2014 | Tang | G06F 16/35 707/723 |
| 8,667,609 B2 | 3/2014 | Tan et al. | |
| 8,775,436 B1 | 7/2014 | Zhou et al. | |
| 8,977,613 B1 | 3/2015 | Cooke et al. | |
| 9,338,251 B2 | 5/2016 | Mehta et al. | |
| 9,471,670 B2 | 10/2016 | Roseman et al. | |
| 9,477,654 B2 | 10/2016 | He et al. | |
| 9,529,897 B2 * | 12/2016 | Tang | G06F 16/3322 |
| 9,535,960 B2 | 1/2017 | Guo et al. | |
| 9,880,999 B2 | 1/2018 | Shalaby et al. | |
| 9,965,547 B2 | 5/2018 | Keyngnaert et al. | |
| 10,216,724 B2 | 2/2019 | Sinha et al. | |
| 10,382,383 B2 * | 8/2019 | Iseminger | G06F 40/186 |
| 10,437,845 B2 | 10/2019 | Anderson | |
| 10,438,167 B2 | 10/2019 | Summerfield | |
| 10,565,533 B2 | 2/2020 | Keyngnaert et al. | |
| 10,789,426 B2 | 9/2020 | Lavallee et al. | |
| 11,023,471 B1 | 6/2021 | Nguyen | |
| 11,113,327 B2 | 9/2021 | Singh et al. | |
| 11,263,753 B2 | 3/2022 | Larlus-Larrondo et al. | |
| 11,282,100 B2 | 3/2022 | Oh et al. | |
| 11,288,242 B2 | 3/2022 | Yan et al. | |
| 11,321,538 B1 | 5/2022 | Fontecilla | |
| 11,348,195 B2 | 5/2022 | Lee et al. | |
| 11,379,670 B1 | 7/2022 | Liu et al. | |
| 11,450,307 B2 | 9/2022 | Perucci et al. | |
| 2002/0042719 A1 | 4/2002 | Chauchard et al. | |
| 2002/0042784 A1 | 4/2002 | Kerven et al. | |
| 2003/0061214 A1 | 3/2003 | Alpha | |
| 2003/0158743 A1 | 8/2003 | Havlick et al. | |
| 2004/0230568 A1 | 11/2004 | Budzyn | |
| 2006/0074871 A1 | 4/2006 | Meyerzon et al. | |
| 2006/0161543 A1 | 7/2006 | Feng et al. | |
| 2009/0234641 A1 | 9/2009 | Laidebeur | |
| 2011/0035374 A1 | 2/2011 | Vadrevu et al. | |
| 2013/0046754 A1 | 2/2013 | Lee | |
| 2016/0162456 A1 | 6/2016 | Munro et al. | |
| 2016/0260033 A1 | 9/2016 | Keyngnaert et al. | |
| 2018/0293978 A1 | 10/2018 | Sinha et al. | |
| 2021/0350079 A1 | 11/2021 | Singh et al. | |
| 2022/0179892 A1 | 6/2022 | Kermode et al. | |

FOREIGN PATENT DOCUMENTS

| | | | |
|---|---|---|---|
| CN | 106095865 B | 4/2019 | |
| CN | 110110054 B | 8/2019 | |
| CN | 112711944 A | 4/2021 | |
| JP | 2000348066 A | 12/2000 | |
| JP | 4922030 B2 | 4/2012 | |
| JP | 5367448 B2 | 12/2013 | |
| WO | 2002099694 A1 | 12/2002 | |
| WO | WO-2012160567 A1 * | 11/2012 | G06F 16/951 |
| WO | 2020052183 A1 | 3/2020 | |
| WO | WO-2022025750 A1 * | 2/2022 | |

OTHER PUBLICATIONS

"Trademark Image Similarity Detection Using Convolutional Neural Network", Published at Applied Sciences, by Hayfa Alshowaish et al., Published Online on [Feb. 8, 2022] https://shorturl.at/jkGO7.

"TradeMarker—Artificial Intelligence Based Trademarks Similarity Search Engine", Published at International Conference on Human-Computer Interaction, by Idan Mosseri et al., Published Online on [Jul. 6, 2019] https://galoren.github.io/files/hci19.pdf.

"Trademark Similarity Evaluation Using a Combination of VIT and Local Features", Published at Information 2023 , by Dmitry Vesnin et al., Published Online on [Jul. 12, 2023] https://www.mdpi.com/2078-2489/14/7/398.

"Content based Trademark Retrieval by Integrating Shape with Colour and Texture Information", Published at International Journal of Computer Applications, by Akriti Nigam et al., Published in [May 2011] https://www.academia.edu/3663215/Content_based_Trademark_Retrieval_by_Integrating_Shape_with_Colour_and_Texture_Information.

"Trademark Fame and Corpus Linguistics", Published at The Columbia Journal of Law & the Arts, by Jake Linford et al..Published Online in [Feb. 2022] https://shorturl.at/qJLV0.

"Elaborative Trademark Similarity Evaluation Using Goods and Services Automated Comparison", Published at ResearchGate, by Daniyil Shmatkov et al., Published Online on [ May 26, 2023] https://shorturl.at/eprAB.

"Shape measures for content based image retrieval: A comparison", Published at Information Processing Management, by Mohan Kankanhalli et al., Published Online in [1997] https://www.academia.edu/16930573/Shape_measures_for_content_based_image_retrieval_A_comparison.

"A linguistic analysis of some Japanese trademark cases", Published at International Journal of Speech Language and the Law, by Mami Hiraike Okawara, Published Online in [Mar. 2006] https://www.academia.edu/77522908/A_linguistic_analysis_of_some_Japanese_trademark_cases.

"Methods of Studying the Semantic Function of Trademarks in the Industrial, Commercial and Advertising", Published at International Journal of Higher Education, by Stadulskaya N.A et al., Published Online on [ Oct. 28, 2019] https://files.eric.ed.gov/fulltext/EJ1232947.pdf.

"Functions of Language in Trademarks", Published at Ritsumeikan Law Review, by Syugo Hotta, Published Online in [2006] http://www.asianlii.org/jp/journals/RitsLRev/2006/1.pdf.

"Mixed Signals in Trademark's "Likelihood of Confusion Law" Does Quality Matter", Published at Valparaiso University Law Review, by Steven John Olsen , Published Online in [2010] https://core.ac.uk/download/pdf/303858695.pdf.

"Trademark Confusion Revealed: An Empirical Analysis", Published at American University Law Review, by Daryl Lim, Found Online on [ Sep. 7, 2023] https://shorturl.at/sGJY8.

"Linguistic analysis in trade mark law:current approaches and new challenges", Published at Middlesex University Research Repository, by Alan Durant et al., Published Online in [2018] https://shorturl.at/iAENR.

"A conceptual model of trademark retrieval based on conceptual similarity", Published at Procedia Computer Science, by Fatahiyah Mohd Anuar et al., Published Online in [2013] https://sci-hub.hkvisa.net/10.1016/j.procs.2013.09.123.

* cited by examiner

… (1) …

LINGUISTIC ANALYSIS TO AUTOMATICALLY GENERATE A HYPOTHETICAL LIKELIHOOD OF CONFUSION OFFICE ACTION USING DUPONT FACTORS

FIELD OF TECHNOLOGY

This disclosure relates generally to the field of linguistic analysis, and, more particularly, to a method and system of linguistic analysis to automatically generate a hypothetical likelihood of confusion office action using Dupont factors.

BACKGROUND

A linguistic tool may be used to analyze a string of characters on a product and/or an article of manufacture (e.g., in a social media platform, e-commerce, in trade, Internet, etc.) to identify a similar product. The linguistic tool may extract a class and/or a category of the product corresponding to the string of characters. The linguistic tool analysis may derive reference data from the categorization and the associated string of characters of the product.

The analysis of the string of characters on the product and the corresponding reference data may help the linguistic tool to identify alikeness and/or its differentiation from other products. The linguistic tool may use a textual string and/or character matching algorithms to analyze the string of characters for identification of the alike products. This textual string and/or character-matching algorithm may require complete, structured data to bring out a relevant result. However, different terminology and/or reference characters may be used to define the same product and/or corresponding categorization. This may result in inefficient linguistic analysis and unsatisfactory inferences.

In addition, the linguistic tool may fail to identify in which sense is a word used according to its context leading to inaccuracy in finding meaningful matching results. Lexical ambiguity and syntactic ambiguity in the textual string may further provide irrelevant and inapt references.

SUMMARY

Disclosed are a method and/or a system of linguistic analysis to automatically generate a hypothetical likelihood of confusion office action using Dupont factors.

In one aspect, a method includes associating a first keyword formed with an alphanumeric string of characters in a first written script with a semantic meaning based on any one of an analysis of a first contextual relevancy of a photograph bearing a visual impression of the first keyword affixed on an article of manufacture, a second contextual relevancy of a description of the article of manufacture on which the first keyword is alleged to be affixed, and a third contextual relevancy of a screenshot bearing the visual impression of the first keyword affixed on a web page. The article of manufacture is visually identified through a neural network and the photograph is verified to be an unmanipulated original of the article of manufacture on which the first keyword is affixed. A service offering is visually marked with the first keyword affixed and is verified to be persisting on the web page for a duration of time inclusive of a current time and/or date. The method includes comparing the first keyword with a second keyword formed with the alphanumeric string of characters with a known semantic meaning as documented in a trusted authority.

In addition, the method includes applying a linguistic artificial intelligence algorithm upon the first keyword and the second keyword in a set of languages including a primary language of the first written script using a deep learning algorithm to determine which of a set of comparative rules form a basis of an arguable similarity. Further, the method includes automatically drafting a proposed argument in issue, rule, application, and/or conclusion format to support a position on the similarity between the semantic inference of the first keyword with the second keyword.

The method may further include training the linguistic artificial intelligence algorithm through continuous algorithm enhancement of artificial intelligence based learning from a large data set of tens of thousands of successful office action, litigation, and/or search string models from any one of the trusted authority and/or other trusted authorities. The method may include generating a list of a suggested trademark classifications by applying a trademark classification determination artificial intelligence algorithm that quantifiably predicts chances of success and/or applicability of the first keyword to the trademark classification determination based on the associating the first keyword formed with the alphanumeric string of characters in the first written script with the semantic meaning based on any one of an analysis described above.

The method may further include generating a list of suggested goods by applying a resonance determination artificial intelligence algorithm that quantifiably predicts that the first keyword is likely to be commercially successful if applied to any of the items on the list of the suggested goods. In addition, the method may include generating the logo design that is automatically suggested, associated with the first keyword. The logo design may be a novel artistic creation which is determined through a unique logo generation artificial intelligence algorithm that automatically suggests artistic designs which are highly likely to register based on a neural network analysis of past actions and/or approvals from the trusted authority.

In addition, the method may further include generating the logo design that is automatically suggested, associated with the first keyword. The logo design may be the novel artistic creation which is determined through the unique logo generation artificial intelligence algorithm that automatically suggests artistic designs which are highly likely to resonate based on the resonance determination artificial intelligence algorithm that quantifiably predicts that logo design is likely to be commercially successful if applied to any of the items on the list of the suggested services.

A style of the logo design may be automatically suggested based on a context of a description of a good or a service associated with the first keyword. The style may be a masculine/feminine, gray/colorful, simple/intricate, approachable/authoritative, conservative/extravagant, fun/serious, necessity/luxury, modern/classic, professional/casual, sporty/elegant, and/or safe/extreme.

The method may further include generating a list of suggested services by applying the resonance determination artificial intelligence algorithm that quantifiably predicts that the first keyword is likely to be commercially successful if applied to any of the items on the list of the suggested services. The resonance determination artificial intelligence algorithm may be geospatially oriented, such that the generated list is predictably prioritized based on a country, a region, a state, and/or a city.

Furthermore, the method may include generating a third keyword that is automatically suggested in place of the first keyword. The third keyword may be a novel keyword which is determined through a unique name generation artificial intelligence algorithm that automatically suggests trademark names which are highly likely to register based on a neural network analysis of past actions and/or approvals from the trusted authority. Additionally, the method may include generating an advertisement associated with the first keyword that is automatically suggested to promote items sold with the first keyword based on a description of a good and/or a service associated with the first keyword.

In another aspect, a system includes a linguistic analysis server to automatically associate a first keyword formed with an alphanumeric string of characters in a first written script with a semantic meaning based on any one of an analysis of a first contextual relevancy of a photograph bearing a visual impression of the first keyword affixed on an article of manufacture, a second contextual relevancy of a description of the article of manufacture on which the first keyword is alleged to be affixed, and a third contextual relevancy of a screenshot bearing the visual impression of the first keyword affixed on a web page. The article of manufacture is visually identified through a neural network and the photograph is verified to be an unmanipulated original of the article of manufacture on which the first keyword is affixed. A service offering is visually marked with the first keyword affixed and is verified to be persisting on the web page for a duration of time inclusive of a current time and date. The system includes a database of a trusted authority communicatively coupled to the linguistic analysis server through a network to compare the first keyword with a second keyword formed with the alphanumeric string of characters with a known semantic meaning as documented in the trusted authority. A linguistic artificial intelligence algorithm of the linguistic analysis server is applied upon the first keyword and the second keyword in a set of languages including a primary language of the first written script using a deep learning algorithm to determine which of a set of comparative rules form a basis of an arguable similarity. The system includes a response generation algorithm of the linguistic analysis server to automatically draft a proposed argument in issue, rule, application, and conclusion format to support a position on the similarity between the semantic inference of the first keyword with the second keyword.

In yet another aspect, a method includes associating a first keyword formed with an alphanumeric string of characters in a first written script with a semantic meaning based on any one of an analysis of a first contextual relevancy of a photograph bearing a visual impression of the first keyword affixed on an article of manufacture, a second contextual relevancy of a description of the article of manufacture on which the first keyword is alleged to be affixed, and a third contextual relevancy of a screenshot bearing the visual impression of the first keyword affixed on a web page. The article of manufacture is visually identified through a neural network and the photograph is verified to be an unmanipulated original of the article of manufacture on which the first keyword is affixed. A service offering is visually marked with the first keyword affixed and is verified to be persisting on the web page for a duration of time inclusive of a current time and date. The method includes comparing the first keyword with a second keyword formed with the alphanumeric string of characters with a known semantic meaning as documented in a trusted authority. In addition, the method includes applying a linguistic artificial intelligence algorithm upon the first keyword and the second keyword in a set of languages including a primary language of the first written script using a deep learning algorithm to determine which of a set of comparative rules form a basis of an arguable similarity. The method further includes training the linguistic artificial intelligence algorithm through continuous algorithm enhancement of artificial intelligence based learning from a large data set of tens of thousands of successful office action, litigation, and/or search string models from any one of the trusted authority and/or other trusted authorities. Additionally, the method includes automatically drafting a proposed argument in issue, rule, application, and conclusion format to support a position on the similarity between the semantic inference of the first keyword with the second keyword.

The methods and systems disclosed herein may be implemented in any means for achieving various aspects, and may be executed in various forms, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
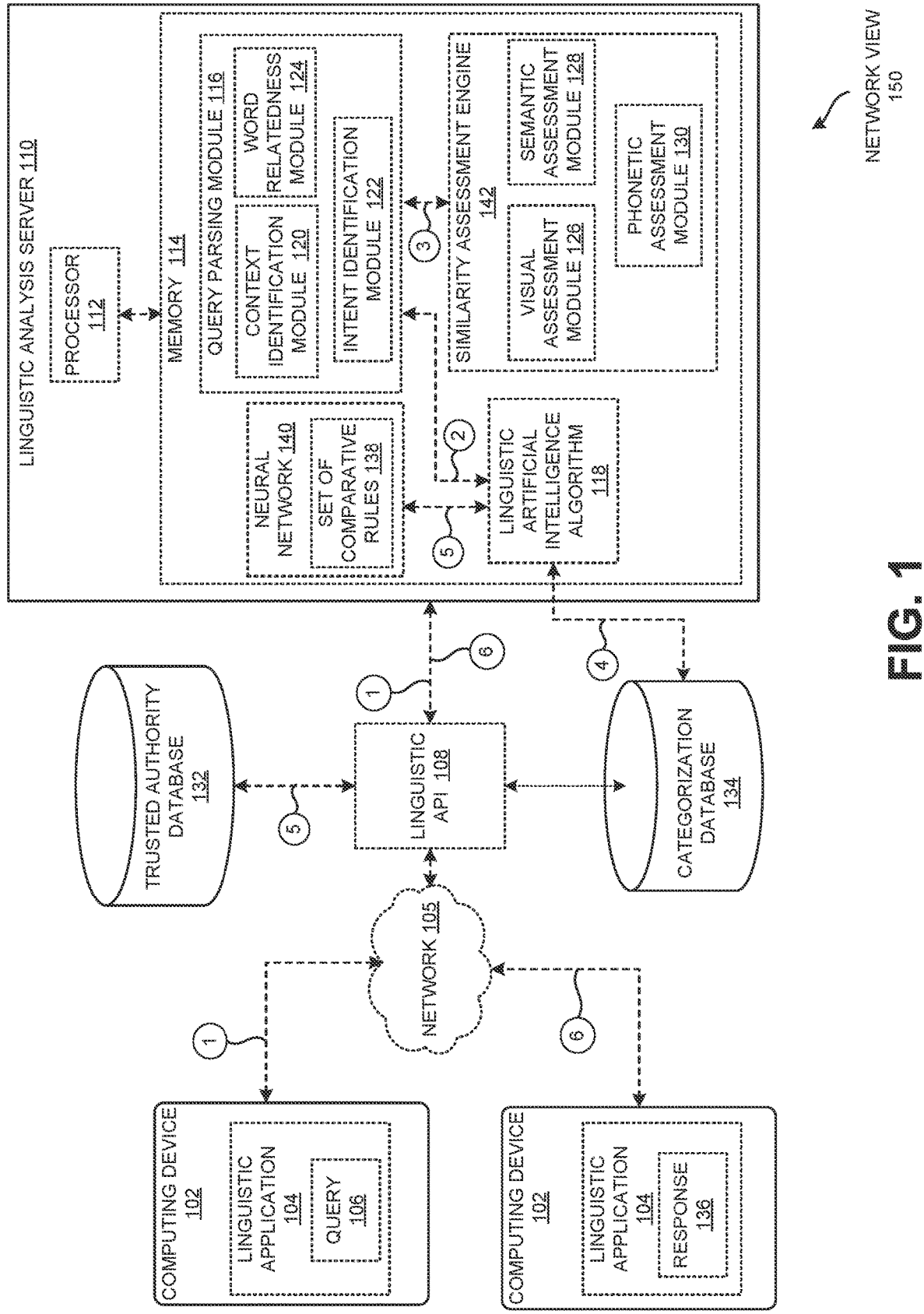
FIG. 1 is a network view illustrating a linguistic analysis server to associate a first written script with a documented string of characters of a trusted authority based on semantic analysis to generate a response to support a position on the similarity between the semantic inference of the first keyword with a second keyword, according to one embodiment.

Other features of the present embodiments will be apparent from the accompanying drawings and from the detailed description that follows.

DETAILED DESCRIPTION

Example embodiments, as described below, may be used to provide a method and/or a system of linguistic analysis to automatically generate a hypothetical likelihood of confusion office action using Dupont factors.

In one embodiment, a method includes associating a first keyword 408 formed with an alphanumeric string of characters 410 in a first written script 404 with a semantic meaning based on any one of an analysis of a first contextual relevancy 412 of a photograph 406 bearing a visual impression of the first keyword 408 affixed on an article of manufacture 402, a second contextual relevancy 420 of a description of the article of manufacture 402 on which the first keyword 408 is alleged to be affixed, and a third contextual relevancy 424 of a screenshot bearing the visual impression of the first keyword 408 affixed on a web page 405. The article of manufacture 402 is visually identified through a neural network 140 and the photograph 406 is verified to be an unmanipulated original of the article of manufacture 402 on which the first keyword 408 is affixed. A service offering is visually marked with the first keyword 408 affixed and is verified to be persisting on the web page 405 for a duration of time inclusive of a current time and/or date. The method includes comparing the first keyword 408 with a second keyword 422 formed with the alphanumeric string of characters 410 with a known semantic meaning as documented in a trusted authority (e.g., trusted authority database 132).

In addition, the method includes applying a linguistic artificial intelligence algorithm 118 upon the first keyword 408 and the second keyword 422 in a set of languages including a primary language of the first written script 404 using a deep learning algorithm to determine which of a set of comparative rules form a basis of an arguable similarity 426. Further, the method includes automatically drafting a proposed argument (e.g., response 136) in issue, rule, application, and/or conclusion format to support a position on the similarity between the semantic inference of the first keyword 408 with the second keyword 422.

The method may further include training the linguistic artificial intelligence algorithm 118 through continuous algorithm enhancement of artificial intelligence based learning (e.g., using neural network 140) from a large data set of tens of thousands of successful office action, litigation, and/or search string models from any one of the trusted authority (e.g., trusted authority database 132) and/or other trusted authorities. The method may include generating a list of a suggested trademark classifications (e.g., using categorization database 134 of the linguistic analysis server 110) by applying a trademark classification determination artificial intelligence algorithm that quantifiably predicts chances of success and/or applicability of the first keyword 408 to the trademark classification determination based on the associating the first keyword 408 formed with the alphanumeric string of characters 410 in the first written script 404 with the semantic meaning based on any one of an analysis described above.

The method may further include generating a list of suggested goods by applying a resonance determination artificial intelligence algorithm (e.g., using linguistic artificial intelligence algorithm 118 of the linguistic analysis server 110) that quantifiably predicts that the first keyword 408 is likely to be commercially successful if applied to any of the items on the list of the suggested goods. In addition, the method may include generating the logo design that is automatically suggested, associated with the first keyword 408. The logo design may be a novel artistic creation which is determined through a unique logo generation artificial intelligence algorithm (e.g., using linguistic artificial intelligence algorithm 118 of the linguistic analysis server 110) that automatically suggests artistic designs which are highly likely to register based on a neural network 140 analysis of past actions and/or approvals from the trusted authority (e.g., trusted authority database 132).

In addition, the method may further include generating the logo design that is automatically suggested, associated with the first keyword 408. The logo design may be the novel artistic creation which is determined through the unique logo generation artificial intelligence algorithm (e.g., using linguistic artificial intelligence algorithm 118 of the linguistic analysis server 110) that automatically suggests artistic designs which are highly likely to resonate based on the resonance determination artificial intelligence algorithm (e.g., using linguistic artificial intelligence algorithm 118 of the linguistic analysis server 110) that quantifiably predicts that logo design is likely to be commercially successful if applied to any of the items on the list of the suggested services.

A style of the logo design may be automatically suggested based on a context of a description of a good or a service associated with the first keyword 408. The style may be a masculine/feminine, gray/colorful, simple/intricate, approachable/authoritative, conservative/extravagant, fun/serious, necessity/luxury, modern/classic, professional/casual, sporty/elegant, and/or safe/extreme.

The method may further include generating a list of suggested services by applying the resonance determination artificial intelligence algorithm (e.g., using linguistic artificial intelligence algorithm 118 of the linguistic analysis server 110) that quantifiably predicts that the first keyword 408 is likely to be commercially successful if applied to any of the items on the list of the suggested services. The resonance determination artificial intelligence algorithm may be geospatially oriented, such that the generated list is predictably prioritized based on a country, a region, a state, and/or a city.

Furthermore, the method may include generating a third keyword that is automatically suggested in place of the first keyword 408. The third keyword may be a novel keyword which is determined through a unique name generation artificial intelligence algorithm (e.g., using linguistic artificial intelligence algorithm 118 of the linguistic analysis server 110) that automatically suggests trademark names which are highly likely to register based on a neural network 140 analysis of past actions and/or approvals from the trusted authority (e.g., trusted authority database 132). Additionally, the method may include generating an advertisement associated with the first keyword 408 that is automatically suggested to promote items sold with the first keyword 408 based on a description of a good and/or a service associated with the first keyword 408.

In another embodiment, a system includes a linguistic analysis server to automatically associate a first keyword 408 formed with an alphanumeric string of characters 410 in a first written script 404 with a semantic meaning based on any one of an analysis of a first contextual relevancy 412 of a photograph 406 bearing a visual impression of the first keyword 408 affixed on an article of manufacture 402, a second contextual relevancy 420 of a description of the article of manufacture 402 on which the first keyword 408 is alleged to be affixed, and a third contextual relevancy 424 of a screenshot bearing the visual impression of the first keyword 408 affixed on a web page 405. The article of manufacture 402 is visually identified through a neural network 140 and the photograph 406 is verified to be an unmanipulated original of the article of manufacture 402 on which the first keyword 408 is affixed. A service offering is visually marked with the first keyword 408 affixed and is verified to be persisting on the web page 405 for a duration of time inclusive of a current time and date. The system includes a database of a trusted authority (e.g., trusted authority database 132) communicatively coupled to the inguistic analysis server through a network to compare the first keyword 408 with a second keyword 422 formed with the alphanumeric string of characters 410 with a known semantic meaning as documented in the trusted authority (e.g., trusted authority database 132). A linguistic artificial intelligence algorithm 118 of the linguistic analysis server is applied upon the first keyword 408 and the second keyword 422 in a set of languages including a primary language of the first written script 404 using a deep learning algorithm to determine which of a set of comparative rules form a basis of an arguable similarity 426. The system includes a response generation algorithm of the linguistic analysis server to automatically draft a proposed argument (e.g., response 136) in issue, rule, application, and conclusion format to support a position on the similarity between the semantic inference of the first keyword 408 with the second keyword 422.

In yet another embodiment, a method includes associating a first keyword 408 formed with an alphanumeric string of characters 410 in a first written script 404 with a semantic meaning based on any one of an analysis of a first contextual relevancy 412 of a photograph 406 bearing a visual impression of the first keyword 408 affixed on an article of manufacture 402, a second contextual relevancy 420 of a description of the article of manufacture 402 on which the first keyword 408 is alleged to be affixed, and a third contextual relevancy 424 of a screenshot bearing the visual impression of the first keyword 408 affixed on a web page 405. The article of manufacture 402 is visually identified through a neural network 140 and the photograph 406 is verified to be an unmanipulated original of the article of manufacture 402 on which the first keyword 408 is affixed. A service offering is visually marked with the first keyword 408 affixed and is verified to be persisting on the web page 405 for a duration of time inclusive of a current time and date. The method includes comparing the first keyword 408 with a second keyword 422 formed with the alphanumeric string of characters 410 with a known semantic meaning as documented in a trusted authority (e.g., trusted authority database 132). In addition, the method includes applying a linguistic artificial intelligence algorithm 118 upon the first keyword 408 and the second keyword 422 in a set of languages including a primary language of the first written script 404 using a deep learning algorithm to determine which of a set of comparative rules form a basis of an arguable similarity 426. The method further includes training the linguistic artificial intelligence algorithm 118 through continuous algorithm enhancement of artificial intelligence based learning from a large data set of tens of thousands of successful office action, litigation, and/or search string models from any one of the trusted authority (e.g., trusted authority database 132) and/or other trusted authorities. Additionally, the method includes automatically drafting a proposed argument (e.g., response 136) in issue, rule, application, and conclusion format to support a position on the similarity between the semantic inference of the first keyword 408 with the second keyword 422.

FIG. 1 is a network view 150 illustrating a linguistic analysis server 110 to associate a first written script 404 with a documented string of characters (alphanumeric string of characters 410) of a trusted authority database 132 based on semantic analysis to generate a response 136 to support a position on the similarity between the semantic inference 418 of the first keyword 408 with a second keyword 422, according to one embodiment. Particularly, FIG. 1 illustrates a computing device 102, a linguistic application 104, a query 106, a network 105, an API 108, a linguistic analysis server 110, a processor 112, a memory 114, a query parsing module 116, a linguistic artificial intelligence algorithm 118, a context identification module 120, an intent identification module 122, a word relatedness module 124, a similarity assessment engine 142, a neural network 140, a visual assessment module 126, a semantic assessment module 128, a phonetic assessment module 130, a set of comparative rules 138, a trusted authority database 132, a categorization database 134, and a response 136, according to one embodiment.

The computing device 102 may be an electronic equipment controlled by a CPU that can perform substantial computations, including numerous arithmetic operations and logic operations without human intervention. The computing device 102 may consist of a standalone unit and/or several interconnected units. The computing device 102 may be a personal computer, a desktops, a laptop, a tablet, a hand-held computer, a server, a workstation, a mainframe, a wearable computer, and/or a supercomputer, according to one embodiment.

The linguistic application 104 may be a computer program designed to carry out a specific task of scientific study of language and its structure through natural language processing. The linguistic application 104 may be a computer software designed to performs a specific function of comprehensive, systematic, objective, and precise analysis of all aspects of language, such as—cognitive, social, environmental, biological as well as structural analysis of language directly for an end user 525 and/or, for another application (e.g., linguistic API 108), according to one embodiment.

The query 106 may be a request for data results from the linguistic analysis server 110 to help perform a linguistic analysis on a set of alphanumeric characters (e.g., string of alphanumeric characters 410) to generate a response 136 based on semantic analysis. The query 106 may be a set of alphanumeric characters including a trademark, a trade name, a logo, and/or a unique slogan that is requested by the end user 525 to the linguistic analysis server 110 through the linguistic API 108 to find out similar trademarks, trade name, logo, and/or unique slogan that exist. The query 106 may help a user 525 to ask simple question, perform calculations, combine data from different tables (e.g., from the trusted authority database 132, categorization database 134) and add, change, or delete data from the linguistic analysis server 110. The query 106 may help a user 525 to request an automatically drafted response to the linguistic analysis server 110 based on a proposed argument in issue, rule, application, and conclusion format to support a position on the similarity between the semantic inference of two or more similar and/or dissimilar trademarks, logo designs, trade names, etc. (e.g., first keyword 408 with the second keyword 414), according to one embodiment.

The network 105 may be a set of computers (e.g., computing device 102, collection of computers, servers, mainframes, network devices, peripherals, etc.) and/or other electronic devices that are interconnected for the purpose of exchanging data and/or sharing resources (e.g., over Internet) located on or provided by network nodes. The computing device 102 may be communicatively coupled to the linguistic analysis server 110 through the network 105 to request and/or perform various functions related to linguistic analysis, according to one embodiment.

The linguistic API 108 may be a mechanism that enable two software components to communicate with each other using a set of definitions and protocols. The linguistic API 108 may be a software interface that allows two applications (e.g., linguistic analysis server 110, a mobile application, and linguistic application 104) to interact with each other without any user intervention. The linguistic API 108 may be a collection of software functions and procedures that can be accessed and/or executed using the computing device 102. The linguistic API 108 may be defined as a code that helps two different software's to communicate and exchange data with each other ((e.g., linguistic analysis server 110 and a mobile application), according to one embodiment.

The linguistic analysis server 110 may be a computer program and/or a device that provides a service to another computer program and its user (e.g., client) a study of language, speech units in terms of its constituent parts, content function and other features, to determine the exact state of language (speech) units. The linguistic analysis server 110 may share data as well as share resources and distribute work within the network 105, according to one embodiment.

The processor 112 may be an integrated electronic circuit that responds to and processes the basic instructions that drives the linguistic analysis server 110. The memory 114 may be a device and/or a system that is used to store information for immediate use in the linguistic analysis server 110, according to one embodiment.

The query parsing module 116 may be a distinct software program to configured to perform a specific task of analyzing and interpreting the keywords and phrases (e.g., query 106) entered by users 525 on the linguistic application 104. The query parsing module 116 may contain variables, functions, classes components.

The linguistic artificial intelligence algorithm 118 may be a set of instructions to be followed in calculations or other operations to study of language in the query 106. It includes a software program for the analysis of language form, language meaning, and/or language in context, according to one embodiment.

The context identification module 120 may be a set of instructions to be followed that identifies a linguistic query's (e.g., query 106) real-time contextual situations from sensory data, using pattern recognition, signal processing and machine learning algorithms, according to one embodiment.

The intent identification module 122 may be a set of instructions to be followed for understanding a user's end goal given what they have said or typed in the form of query 106 using the linguistic application 104. The intent identification module 122 may be the first step in turning a human request into a machine-executable command, according to one embodiment.

The word relatedness module 124 may be a set of instructions to be followed to quantify the degree to which two words are associated with each other in a query 106. The word relatedness module 124 may help evaluate the degree of how much one word has to do with another word or a subset of word relatedness. For example, the word relatedness module 124 may evaluate how and/or whether a particular trademark (e.g., first keyword 408) is related to an article of manufacture 402 and/or its classification of goods and services (e.g., using the trusted authority database 132 and categorization database 134) and whether a similar trademark (e.g., second keyword 414) is associated with similar article of manufacture 402 having similar classification of goods and services (e.g., using the trusted authority database 132 and categorization database 134), according to one embodiment.

The similarity assessment engine 142 may be a program that executes the foundation and/or crucial task for other programs to assess the similarity between two entities in a query 106. The similarity assessment engine 142 may create a function that takes a pair of objects (e.g., pair of trademarks or logos forming a query 106) and produces a numerical score quantifying their relatedness. The similarity assessment engine 142 may be a self-contained, but externally-controllable, piece of code that encapsulates powerful logic designed to perform a specific type of work to assess the similarity between two or more entities in the query 106, according to one embodiment.

The neural network 140 may be a series of algorithms that endeavors to recognize underlying relationships in a set of data (e.g., query 106) derived by the linguistic analysis server 110 through a process that mimics the way the human brain operates. The neural network 140 may be a computational learning system that uses a network of functions to understand and translate a data input in the form of query 106 into a desired output to generate a response 136 based on the semantic analysis. The neural network 140 may learn from processing many labeled examples (i.e. data="query 106" with anwer="response 136") that are supplied during training and using this answer key to learn what characteristics of the input (e.g., query 106) are needed to construct the correct output (e.g., response 136). Once a sufficient number of examples have been processed, the neural network 140 may begin to process new, unseen inputs (e.g., query 106) and successfully return accurate results (e.g., response 136). The more examples and variety of inputs the program sees, the more accurate the results typically become because the program learns with experience, according to one embodiment.

In an example embodiment, the neural network 140 may train the linguistic artificial intelligence algorithm 118 through continuous algorithm enhancement of artificial intelligence based learning from a large data set of tens of thousands of successful office action, litigation, and search string models from any one of the trusted authority database 132 and/or other trusted authorities.

The visual assessment module 126 may be a program that executes the foundation and/or crucial task for other programs to assess the visual content of the two or more entities (e.g., trademarks, logos, etc.) in a query 106 to score similarity and/or dissimilarity between two or more entities. The visual assessment module 126 may create a function that takes a pair of objects (e.g., pair of trademarks and/or logos forming a query 106) and produces a numerical score quantifying their relatedness.

The semantic assessment module 128 may be a set of instructions to be followed to draw meaning from text. The semantic assessment module 128 may allow the linguistic analysis server 110 to understand and interpret the query 106 (e.g., sentences, paragraphs, or whole documents), by analyzing their grammatical structure, and identifying relationships between individual words in a particular context. The semantic assessment module 128 may help the linguistic analysis server 110 to automatically extract meaningful information from unstructured data, such as emails, support tickets, and customer feedback, according to one embodiment.

The phonetic assessment module 130 may be a program that executes the foundation and/or crucial task for other programs to assess the phonetic content of two or more entities (e.g., trademarks, logos, first keyword 408, second keyword 422, etc.) in a query 106 to score similarity and/or dissimilarity between two or more entities (e.g., trademarks, logos, etc.). The phonetic assessment module 130 may create a function that takes a pair of objects (e.g., pair of trademarks and/or logos forming a query 106) and produces a numerical score quantifying their relatedness, according to one embodiment.

The set of comparative rules 138 may be a collection of relative orders that forms a basis of an arguable similarity between a the first keyword 408 and the second keyword 408 in a set of languages in the first written script 404 (e.g., trademarks, logos, trade name, etc.) on an article of manufacture 402. In one example embodiment, the set of comparative rules 138 may be a set list of factors to determine the scope of a trademark whether there is "likelihood of confusion", between a particular trademark and another trademark in the minds of the consuming public. These factors called DuPont factors may form the basis of set of comparative rules 138 and may include determining the similarity and/or dissimilarity of the trademarks in their entireties as to appearance, sound, connotation, and/or commercial impression. The similarity and/or dissimilarity and nature of the goods described in an application or registration or in connection with which a prior mark is in use. The similarity of the marks, the similarity of the goods or services on which the marks are or will be used, and the conceptual and commercial strength of the senior mark may be determined using the set of comparative rules 138, according to one embodiment.

According to one embodiment, the set of comparative rules 138 may include:
1. The similarity or dissimilarity of the marks (e.g., trademarks, logos, first keyword 408, second keyword 422, etc.) in their entireties as to appearance, sound, connotation, and commercial impression.
2. The similarity or dissimilarity and nature of the goods (e.g., article of manufacture 402) . . . described in an application or registration (e.g., trademarks, logos, etc.) or in connection with which a prior mark is in use.
3. The similarity or dissimilarity of established, likely-to-continue trade channels (e.g., using the web page 405).
4. The conditions under which and buyers to whom sales are made, i.e. "impulse" vs. careful, sophisticated purchasing.
5. The fame of the prior mark.
6. The number and nature of similar marks in use on similar goods (e.g., using the categorization database 134 of the linguistic analysis server 110).
7. The nature and extent of any actual confusion (e.g., using the linguistic artificial intelligence algorithm 118 of the linguistic analysis server 110).
8. The length of time during and the conditions under which there has been concurrent use without evidence of actual confusion (e.g., using the linguistic artificial intelligence algorithm 118 of the linguistic analysis server 110).
9. The variety of goods (e.g., determined using the categorization database 134 of the linguistic analysis server 110) on which a mark is or is not used.
10. The market interface between the applicant and the owner of a prior mark (e.g., using the web page 405 of the linguistic analysis server 110).
11. The extent to which applicant has a right to exclude others from use of its mark on its goods.
12. The extent of potential confusion (e.g., first keyword 408, second keyword 422, etc.).
13. Any other established fact probative of the effect of use.

The trusted authority database 132 may be an electronic repository of special authoritative and/or confidential services that is trusted by identities (e.g., people, businesses, governments and so on) either by some positive action or by default. The trusted authority database 132 may include an organized collection of structured information of registered live and dead trademarks, logos, trade names, etc. that may be used in commerce, according to one embodiment.

The categorization database 134 may be a method of arranging the goods and services into groups called classification. The goods and services may be classified into groups based on their characteristics in the categorization database 134. The categorization database 134 may be a repository of class and/or category a particular goods and services belongs to, according to its characteristics.

The response 136 may be an automatically generated reply of the linguistic analysis server 110 in the form of written script to answer a query 106. The query 106 may include a trademark, a trade name, a logo, and/or a unique slogan that is requested to the linguistic analysis server 110 to find out similar trademarks, trade name, logo, and/or unique slogan that exist. The linguistic artificial intelligence algorithm 118 of the linguistic analysis server 110 may perform a linguistic analysis on a set of alphanumeric characters (e.g., string of alphanumeric characters 410) derived from the query 106 to find out similar rademarks, trade name, logo, and/or unique slogan from the trusted authority database 132 based on the similarity and/or dissimilarity of the trademarks, trade name, logo, and/or unique slogan. The linguistic artificial intelligence algorithm 118 may further generate a response 136 based on semantic analysis of the similar rademark, similar trade name, similar logo, and/or similar slogan found in the the trusted authority database 132. The neural network 110 of the linguistic analysis server 110 may automatically draft a proposed argument in issue, rule, application, and conclusion format to support a position on the similarity (and/or similarity) between the semantic inference 418 of the first keyword 408 with the second keyword 414 (e.g., in the query 106, trademarks, trade name, logo, and/or unique slogan).

In an example embodiment, the linguistic analysis server 110 may generate a list of a suggested trademark classifications by applying a trademark classification determination artificial intelligence algorithm (e.g., using the neural network 140) that quantifiably predicts chances of success and applicability of the first keyword 408 to the trademark classification determination based on the associating the first keyword 408 formed with the alphanumeric string of characters 410 in the first written script 404 with the semantic meaning based on the semantic analysis.

In circle "1", a user may submit a query 106 (e.g., entities, pair of objects, trademarks or logos forming a query 106) to the linguistic analysis server 110 through a linguistic application 104 using a computing device 102 communicatively coupled to the the linguistic analysis server 110 via a network 105. In circle "2", the query parsing module 116 may analyze and interpreting the keywords and phrases (e.g., query 106) entered by users 525 on the linguistic application 104 using the context identification module 120, the intent identification module 122, and the word relatedness module 124. In circle "3", the similarity assessment engine 142 may assess the similarity between two entities in the query 106 using the visual assessment module 126, the semantic assessment module 128 and the phonetic assessment module 130 derived from the trusted authority database 132. In circle "4", the linguistic artificial intelligence algorithm 118 may extract the categorization (e.g., classification of goods and services of the pair of objects forming a query 106) of the respective entities from the categorization database 134. In circle "5", the linguistic artificial intelligence algorithm 118 may extract similar entities from the trusted authority database 132 based on the semantic analysis of the query 106 (e.g., entities, pair of objects, trademarks or logos forming a query 106). In circle "6", the neural network 140 may draft a response 136 based on the set of comparative rules of the linguistic analysis server 110 to send to the user via the linguistic application 136, according to one embodiment.

Figure 2:
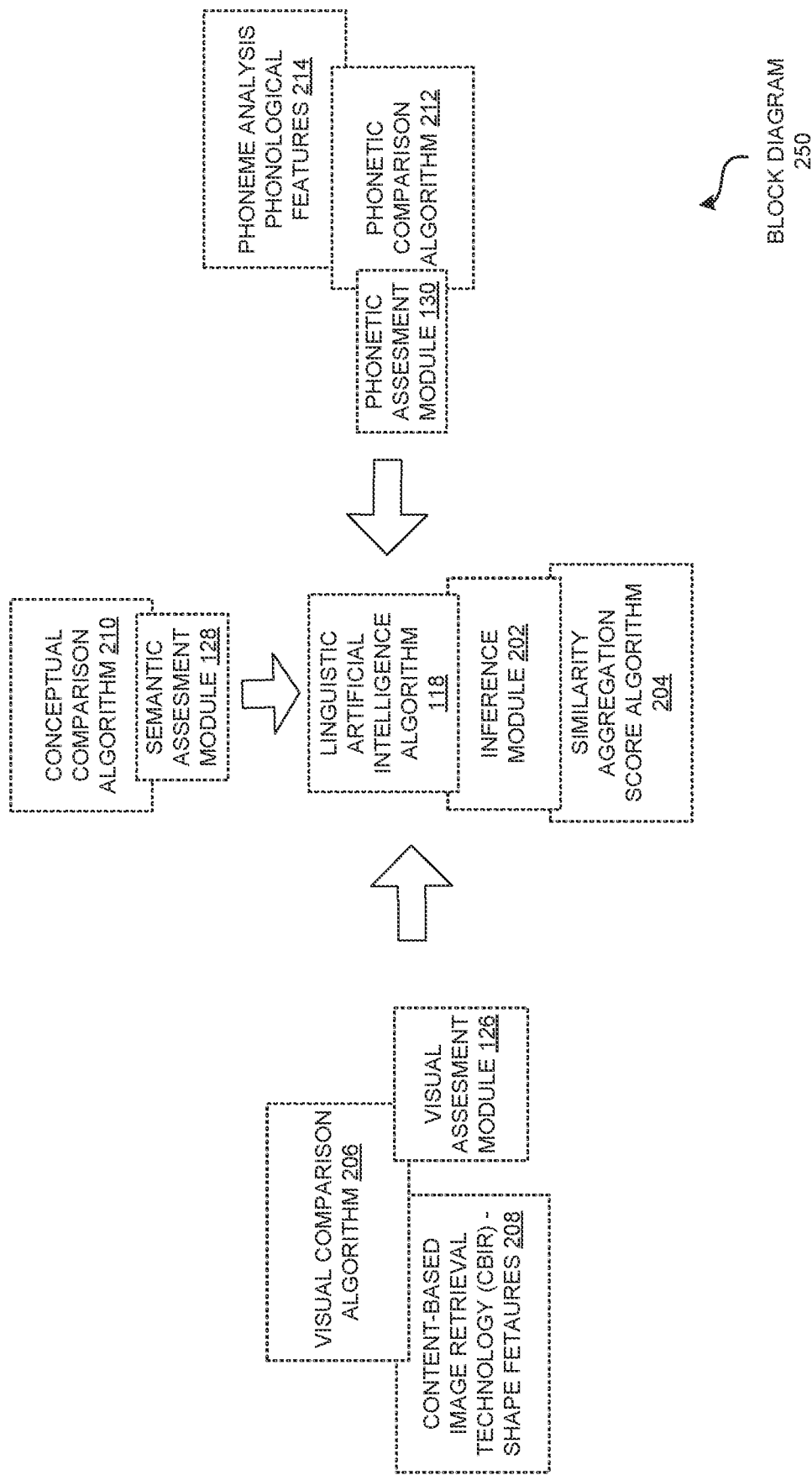
FIG. 2 is a block diagram illustrating a semantic analysis module and an inference module of the linguistic analysis server of FIG. 1, according to one embodiment.

FIG. 2 is a block diagram 250 illustrating the semantic analysis module 128 and an inference module 202 of the linguistic analysis server 110 of FIG. 1, according to one embodiment. Particularly, FIG. 2 builds on FIG. 1, and further adds a inference module 202. The inference module 202 may be a set of instructions to be followed to derive a conclusion whether a trademark, a logo, a slogan, and/or a trade name forming the query 106 is similar and/or dissimilar to an existing trademark, logo, slogan, and/or trade name on the basis of evidence and reasoning. The phonetic assessment module 130 may be a set of instructions to be followed to assess the speech sounds, their production, and/or their transcription in written symbols in the the query 106, according to one embodiment.

The phonetic comparison algorithm 212 may conduct a phoneme analysis of phonological features 214 to analyze the similarity and dissimilarity of the trademark, logo, slogan, and/or trade name forming the query 106 (first keyword 408, second keyword 422). The visual assessment module 126 of the linguistic analysis server 110 may be a set of instructions to be followed to retrieve a similar image from the trusted authority database 132. The visual comparison algorithm 206 may use a Content-based image retrieval (CBIR) technology shape features 208 in which for a given query 106 image (e.g., logo, trademark, etc.), similar images are retrieved from the trusted authority database 132 based on their content similarity and categorization. The semantic assessment module 128 of the linguistic analysis server 110 may use a conceptual comparison algorithm 210 to analyse the similarity between two entities in the query 106. The similarity aggregation score algorithm 204 may be set of instructions to be followed to produce an aggregate numerical score quantifying the similarity and/or similarity of a pair of objects forming the query 106. The aggregate numerical score quantifying the similarity and/or similarity may help linguistic analysis server 110 generate an appropriate response 136 containing a proposed argument in issue, rule, application, and conclusion format to support a position on the similarity between the semantic inference of the pair of objects forming the query 106 (e.g., first keyword 408, second keyword 422), according to one embodiment.

Figure 3:
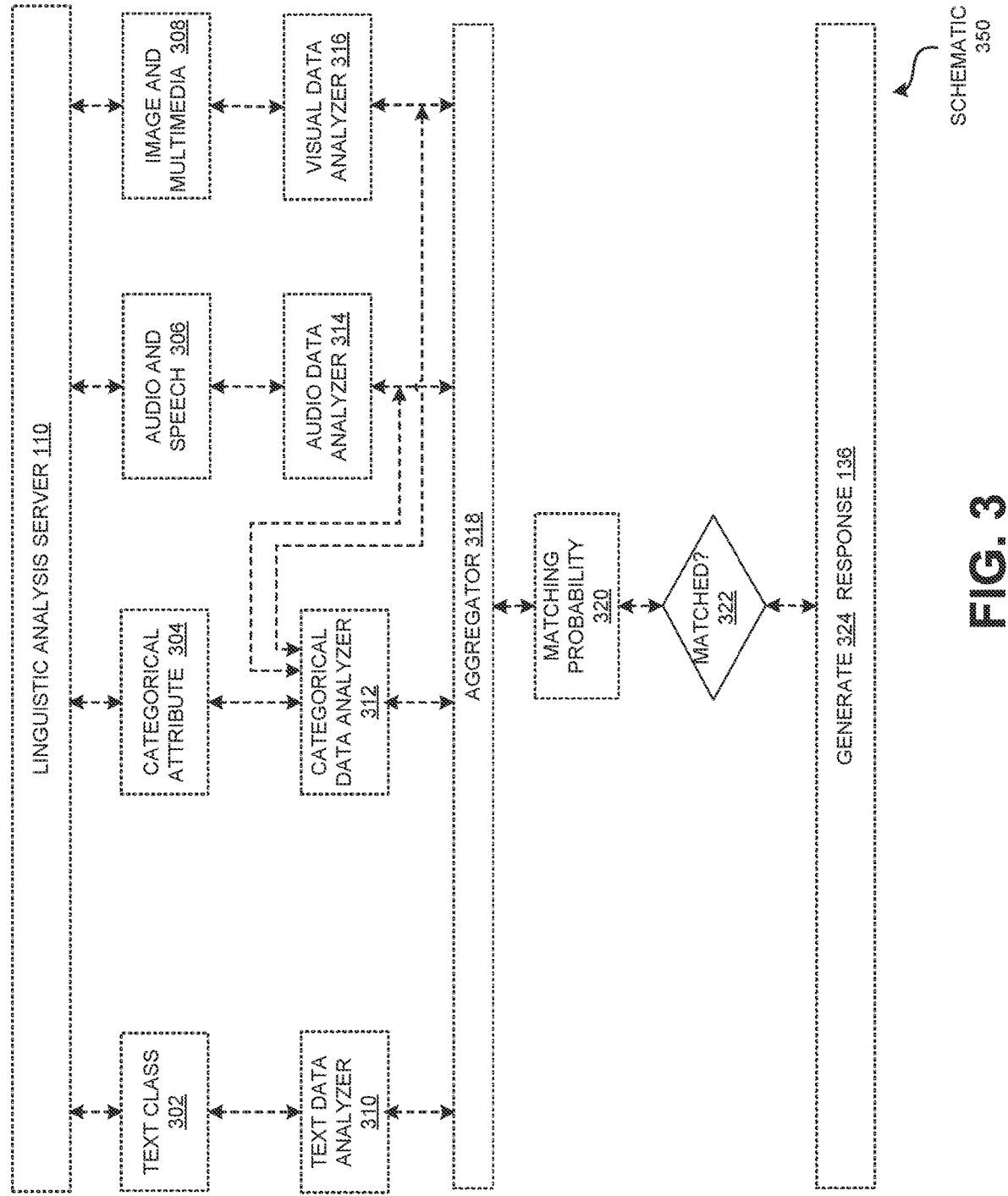
FIG. 3 is a flow diagram of the linguistic analysis server of FIG. 1 illustrating the semantic analysis layers of the system, according to one embodiment.

FIG. 3 is a schematic view 350 of the linguistic analysis server 110 of FIG. 1 illustrating the semantic analysis layers of the system, according to one embodiment. The linguistic analysis server 110 may receive a query 106 in the form of a pair of logos, trademarks, trade names, and/or unique logos. The query parsing module 116 may parse the input data (e.g., query 106) to derive its text class 302, categorical attribute 304, audio and speech 306 of the input data, and the image and multimedia 308 content of the input data. The linguistic artificial intelligence algorithm 118 may use the text data analyzer 310 derive the class of the input data, audio data analyzer 314 and visual data analyzer 316 to derive respective category of the input data. Based on the categorical attribute 304, audio data analyzer 314 and visual data analyzer 316, the categorical data analyzer 314 may derive the respective classification of the input data from the categorization database 134 for the goods and services. The aggregator 318 may generate a matching probability 320 score based on the similarity and/or dissimilarity (e.g., using decision function matched? 322) of the pair of logos, trademarks, trade names, and/or unique logos the input data (e.g., query 106). The linguistic analysis server 110 may generate 324 a response 136 based on the matching probability 320 score of the aggregator 318, according to one embodiment.

Figure 4:
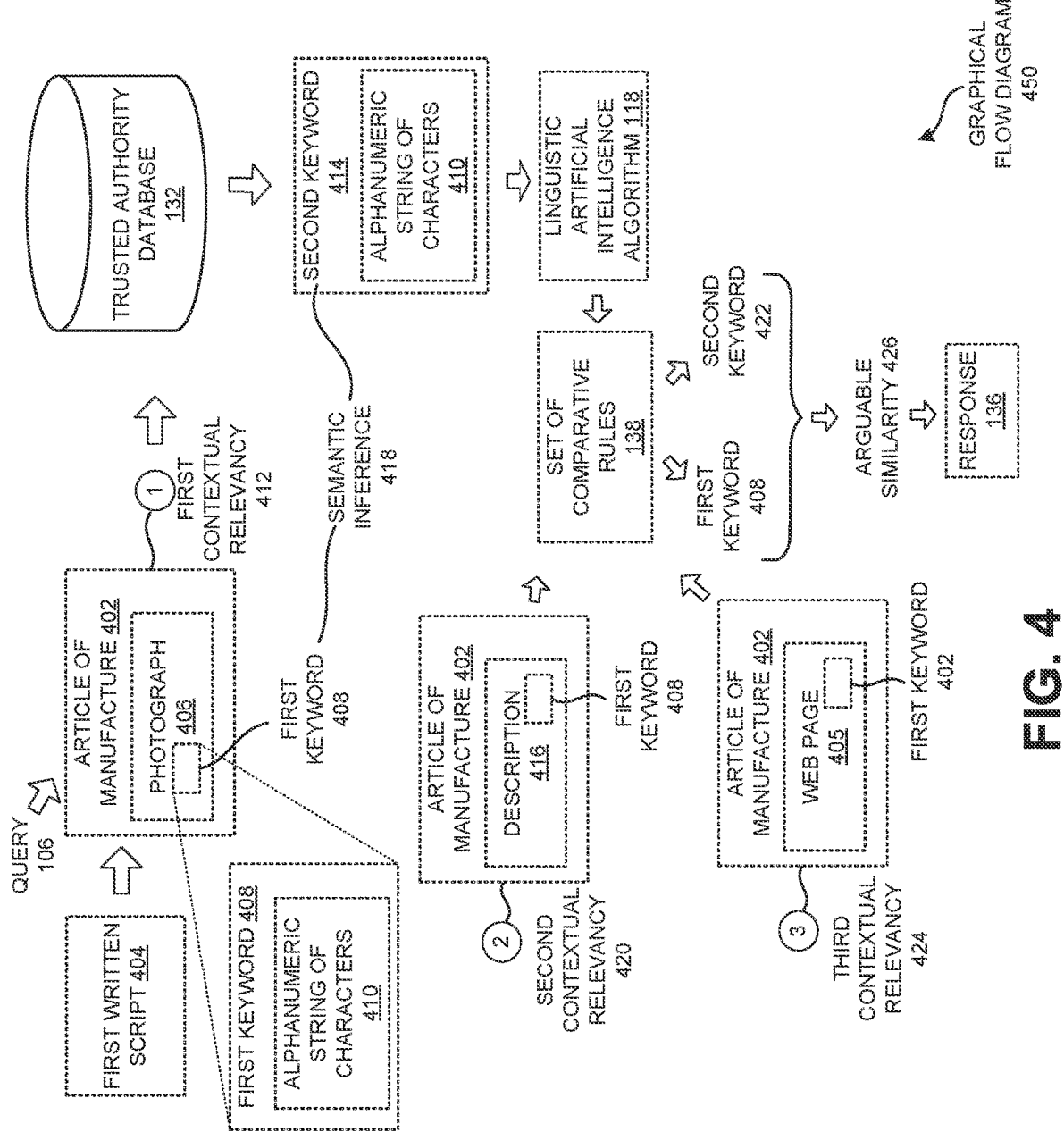
FIG. 4 is a graphical flow diagram of the linguistic analysis server of FIG. 1 illustrating steps of the linguistic analysis server to associate a first written script with a documented string of characters of a trusted authority based on semantic analysis to generate a response to support a position on the similarity between the semantic inference of the first keyword with a second keyword, according to one embodiment.

FIG. 4 is a graphical flow diagram 450 of the linguistic analysis server 110 of FIG. 1 illustrating steps of the linguistic analysis server 110 to associate a first written script 404 with a documented string of characters (e.g., alphanumeric string of characters 410) of a trusted authority database 132 based on semantic analysis to generate a response 136 to support a position on the similarity (e.g., arguable similarity 426) between the semantic inference 418 of the first keyword 408 with a second keyword 422, according to one embodiment. A user 525 may request to determine whether a likelihood of confusion exists between a particular trademark and a number of other trademarks. The user 525 may submit a query 106 of the particular trademark (e.g., first written script 404) and a number of other trademarks through the linguistic application 104 to generate an automatic response using linguistic analysis server 110. The linguistic analysis server 110 may form a first keyword 408 from a first written script 404 on an article of manufacture 402. The first keyword 408 may include an alphanumeric string of characters 410. The linguistic analysis server 110 may derive the first contextual relevancy 412 in circle "1" of a photograph 406 affixed on the article of manufacture 402 bearing a visual impression of the first keyword 408 based on the semantic analysis. The linguistic analysis server 110 may derive the first contextual relevancy 412 by using the context identification module 120, the intent identification module 122, and the word relatedness module 124, according to one embodiment.

The linguistic analysis server 110 may derive the second contextual relevancy 420 in circle "2" of the description 416 of the article of manufacture 402 on which the first keyword 408 is affixed to determine the categorization and classification of the article of manufacture 402 from the categorization database 134. The linguistic analysis server 110 may further derive the third contextual relevancy 424 in circle "3" of the first keyword 408 affixed on a web page 405 through a screenshot bearing the visual impression of first keyword 408. The linguistic analysis server 110 may associate the first keyword 408 with a semantic meaning based on above analysis and may compare the first keyword 408 with a second keyword 422 having a known semantic meaning as documented in a trusted authority database 132. The linguistic analysis server 110 may apply the linguistic artificial intelligence algorithm 118 upon the first keyword 408 and the second keyword 422 to determine which of the set of comparative rules 138 form a basis of an arguable similarity 426 between the first keyword 408 and the second keyword 422. Accordingly, the neural network 140 of the linguistic analysis server 110 may generate the response 136 based on the arguable similarity 426, according to one embodiment.

Figure 5:
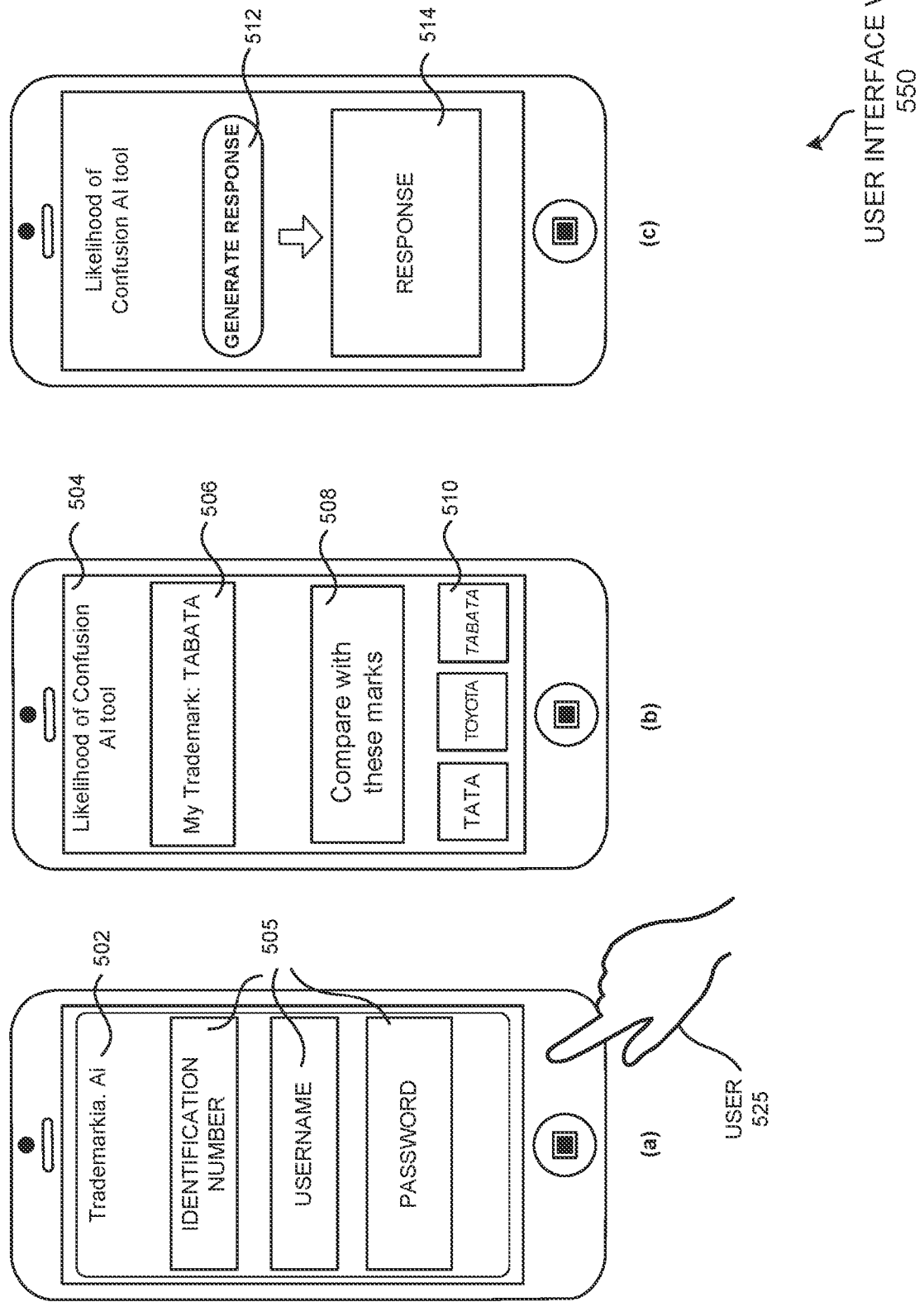
FIG. 5 is an exemplary user interface view of the linguistic analysis server of FIG. 1, according to one embodiment.

FIG. 5 is an exemplary user interface view 550 of the linguistic analysis server 110 of FIG. 1, according to one embodiment. As shown in FIG. 5 (*a*), a user 525 may create an account in the linguistic analysis server 110 through his mobile device interface 502 of the linguistic application 104 using his log in credentials 505 such as user name, password and identification number, etc. In FIG. 5 (*b*), the user 525 may navigate to the likelihood of confusion Ai tool 504 and submit a query 106 containing his trademark in the 506 field. Further, the user 525 may submit a number of similar trademarks in the 506 field and request the Ai tool 504 to compare the query 106 submitted in the 510 field. In FIG. 5 (*c*), the user 525 may use the generate response 512 tab to request a response 136. The linguistic analysis server 110 may use various embodiments of FIGS. 1-4 to generate the response 136 in the form of written script displayed in the 514 field, according to one embodiment.

Figure 6:
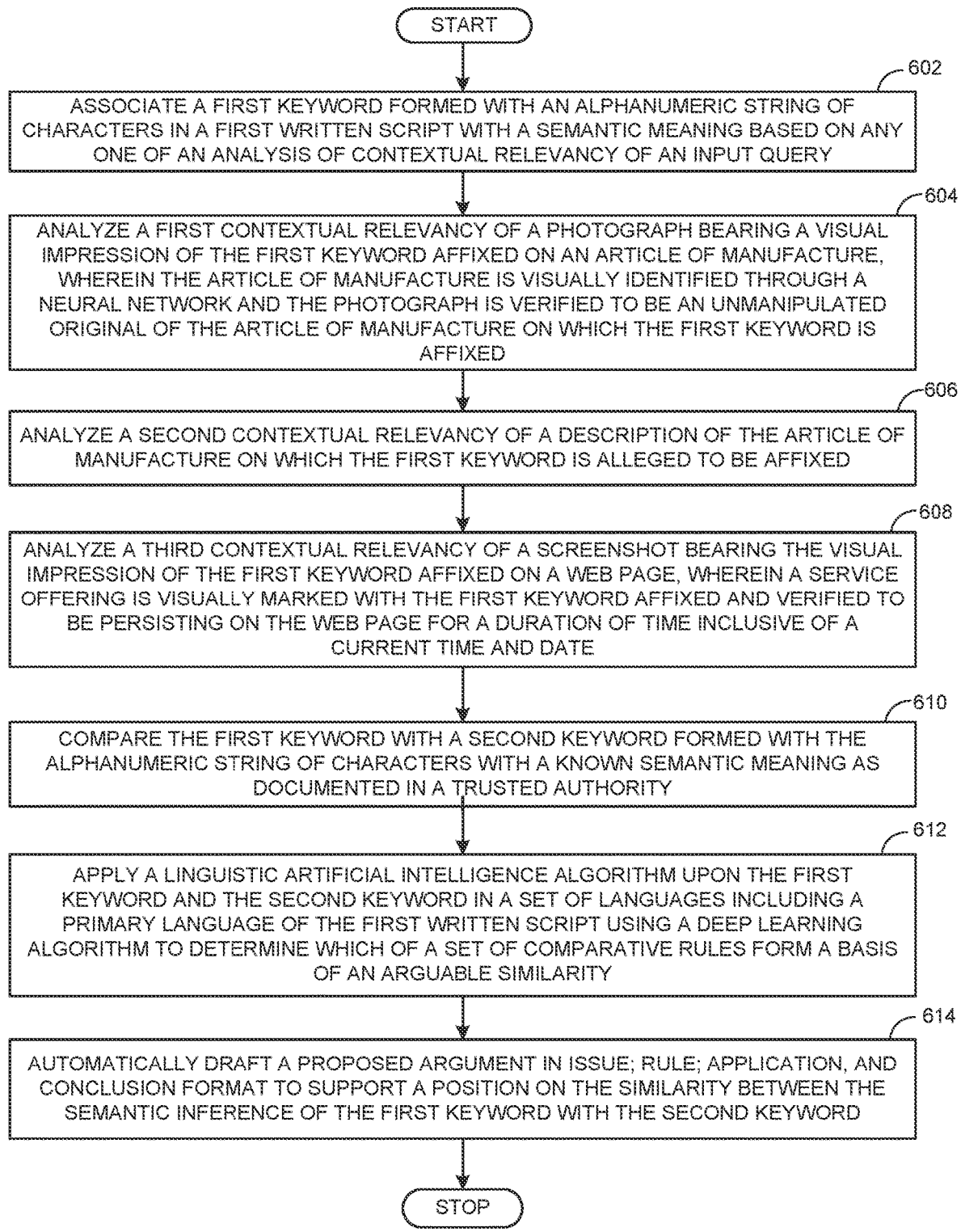
FIG. 6 is a process flow diagram detailing the operations involved in generating a response to support a position on the similarity between the semantic inference of the first keyword with the second keyword by the linguistic analysis server of FIG. 1, according to one embodiment.

FIG. 6 is a process flow 650 diagram detailing the operations involved in generating a response 136 to support a position on the similarity between the semantic inference 418 of the first keyword 408 with the second keyword 422 by the linguistic analysis server 110 of FIG. 1, according to one embodiment.

In operation 602, the linguistic analysis server 110 may associate a first keyword 408 formed with an alphanumeric string of characters 410 in a first written script 404 with a semantic meaning based on any one of an analysis of the contextual relevancy of an input query 106. In operation 604, the linguistic analysis server 110 may analyze a first contextual relevancy 412 of a photograph 406 bearing a visual impression of the first keyword 408 affixed on an article of manufacture 402. The article of manufacture 402 is visually identified through a neural network 140 and the photograph 406 is verified to be an unmanipulated original of the article of manufacture 402 on which the first keyword 408 is affixed, according to one embodiment.

In operation 606, the linguistic analysis server 110 may analyze a second contextual relevancy 420 of a description of the article of manufacture 402 on which the first keyword 408 is alleged to be affixed. In operation 608, the linguistic analysis server 110 may analyze a third contextual relevancy 424 of a screenshot bearing the visual impression of the first keyword 408 affixed on a web page 405. A service offering is visually marked with the first keyword 408 affixed, and verified to be persisting on the web page 405 for a duration of time inclusive of a current time and date, according to one embodiment.

In operation 610, the linguistic analysis server 110 may compare the first keyword 408 with a second keyword 414 formed with the alphanumeric string of characters 410 with a known semantic meaning as documented in a trusted authority database 132. In operation 612, the linguistic analysis server 110 may apply a linguistic artificial intelligence algorithm 118 upon the first keyword 408 and the second keyword 414 in a set of languages including a primary language of the first written script 404 using a deep learning algorithm (e.g., neural network 140) to determine which of a set of comparative rules 138 form a basis of an arguable similarity 426, according to one embodiment.

In operation 614, the linguistic analysis server 110 may automatically draft a proposed argument in issue, rule, application, and conclusion format to support a position on the similarity between the semantic inference 418 of the first keyword 408 with the second keyword 414, according to one embodiment.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A method comprising:
   associating a first keyword formed with an alphanumeric string of characters in a first written script with a semantic meaning based on any one of an analysis of:
      a first contextual relevancy of a photograph bearing a visual impression of the first keyword affixed on an article of manufacture, wherein the article of manufacture is visually identified through a neural network and the photograph is verified to be an unmanipulated original of the article of manufacture on which the first keyword is affixed,
      a second contextual relevancy of a description of the article of manufacture on which the first keyword is alleged to be affixed, and
      a third contextual relevancy of a screenshot bearing the visual impression of the first keyword affixed on a web page, wherein a service offering is visually marked with the first keyword affixed, and verified to be persisting on the web page for a duration of time inclusive of a current time and date;
   comparing the first keyword with a second keyword formed with the alphanumeric string of characters with a known semantic meaning as documented in a trusted authority;
   applying a linguistic artificial intelligence algorithm upon the first keyword and the second keyword in a set of languages including a primary language of the first written script using a deep learning algorithm to determine which of a set of comparative rules form a basis of an arguable similarity; and
   automatically drafting a proposed argument in issue, rule, application, and conclusion format to support a position on the similarity between the semantic inference of the first keyword with the second keyword.

2. The method of claim 1 further comprising training the linguistic artificial intelligence algorithm through continuous algorithm enhancement of artificial intelligence based learning from a large data set of tens of thousands of successful office action, litigation, and search string models from any one of the trusted authority and other trusted authorities.

3. The method of claim 1 further comprising generating a list of a suggested trademark classifications by applying a trademark classification determination artificial intelligence algorithm that quantifiably predicts chances of success and applicability of the first keyword to the trademark classification determination based on the associating the first keyword formed with the alphanumeric string of characters in the first written script with the semantic meaning based on any one of an analysis described in claim 1.

4. The method of claim 1 further comprising generating a list of suggested goods by applying a resonance determination artificial intelligence algorithm that quantifiably predicts that the first keyword is likely to be commercially successful if applied to any of the items on the list of the suggested goods.

5. The method of claim 4 further comprising generating the logo design, that is automatically suggested, associated with the first keyword, wherein the logo design is a novel artistic creation which is determined through a unique logo generation artificial intelligence algorithm that automatically suggests artistic designs which are highly likely to register based on a neural network analysis of past actions and approvals from the trusted authority.

6. The method of claim 5 further comprising generating the logo design, that is automatically suggested, associated with the first keyword, wherein the logo design is the novel artistic creation which is determined through the unique logo generation artificial intelligence algorithm that automatically suggests artistic designs which are highly likely to resonate based on the resonance determination artificial intelligence algorithm that quantifiably predicts that logo design is likely to be commercially successful if applied to any of the items on the list of the suggested services.

7. The method of claim 6 wherein a style of the logo design is automatically suggested based on a context of a description of at least one of a good or a service associated with the first keyword, wherein the style is at least one masculine/feminine, gray/colorful, simple/intricate, approachable/authoritative, conservative/extravagant, fun/serious, necessity/luxury, modern/classic, professional/casual, sporty/elegant, and safe/extreme.

8. The method of claim 6 further comprising generating a list of suggested services by applying the resonance determination artificial intelligence algorithm that quantifiably predicts that the first keyword is likely to be commercially successful if applied to any of the items on the list of the suggested services.

9. The method of claim 4 wherein the resonance determination artificial intelligence algorithm is geospatially oriented, such that the generated list is predictably prioritized based on a counter, a region, a state, and a city.

10. The method of claim 1 further comprising generating a third keyword, that is automatically suggested in place of the first keyword, wherein the third keyword is a novel keyword which is determined through a unique name generation artificial intelligence algorithm that automatically suggests trademark names which are highly likely to register based on a neural network analysis of past actions and approvals from the trusted authority.

11. The method of claim 1 further comprising generating an advertisement associated with the first keyword, that is automatically suggested to promote items sold with the first keyword based on a description of at least one of a good and a service associated with the first keyword.

12. A system comprising:
a linguistic analysis server to automatically associate a first keyword formed with an alphanumeric string of characters in a first written script with a semantic meaning based on any one of an analysis of:
a first contextual relevancy of a photograph bearing a visual impression of the first keyword affixed on an article of manufacture, wherein the article of manufacture is visually identified through a neural network and the photograph is verified to be an unmanipulated original of the article of manufacture on which the first keyword is affixed,
a second contextual relevancy of a description of the article of manufacture on which the first keyword is alleged to be affixed, and
a third contextual relevancy of a screenshot bearing the visual impression of the first keyword affixed on a web page, wherein a service offering is visually marked with the first keyword affixed, and verified to be persisting on the web page for a duration of time inclusive of a current time and date;
a database of a trusted authority communicatively coupled to the linguistic analysis server through a network to compare the first keyword with a second keyword formed with the alphanumeric string of characters with a known semantic meaning as documented in the trusted authority;
a linguistic artificial intelligence algorithm of the linguistic analysis server to apply upon the first keyword and the second keyword in a set of languages including a primary language of the first written script using a deep learning algorithm to determine which of a set of comparative rules form a basis of an arguable similarity; and
a response generation algorithm of the linguistic analysis server to automatically draft a proposed argument in issue, rule, application, and conclusion format to support a position on the similarity between the semantic inference of the first keyword with the second keyword.

13. The system of claim 12 wherein the linguistic analysis server to train the linguistic artificial intelligence algorithm through continuous algorithm enhancement of artificial intelligence based learning from a large data set of tens of thousands of successful office action, litigation, and search string models from any one of the trusted authority and other trusted authorities.

14. The system of claim 12 wherein the linguistic analysis server to generate a list of a suggested trademark classifications by applying a trademark classification determination artificial intelligence algorithm that quantifiably predicts chances of success and applicability of the first keyword to the trademark classification determination based on the associating of the first keyword formed with the alphanumeric string of characters in the first written script with the semantic meaning based on any one of an analysis described in claim 12.

15. The system of claim 12 wherein the linguistic analysis server generate a list of suggested goods by applying a resonance determination artificial intelligence algorithm that quantifiably predicts that the first keyword is likely to be commercially successful if applied to any of the items on the list of the suggested goods.

16. The system of claim 12 wherein the linguistic analysis server to generate the logo design, that is automatically suggested, associated with the first keyword, wherein the logo design is a novel artistic creation which is determined through a unique logo generation artificial intelligence algorithm that automatically suggests artistic designs which are highly likely to register based on a neural network analysis of past actions and approvals from the trusted authority.

17. The system of claim 15 wherein the linguistic analysis server to generate the logo design, that is automatically suggested, associated with the first keyword, wherein the logo design is the novel artistic creation which is determined through the unique logo generation artificial intelligence algorithm that automatically suggests artistic designs which are highly likely to resonate based on the resonance determination artificial intelligence algorithm that quantifiably predicts that logo design is likely to be commercially successful if applied to any of the items on the list of the suggested services.

18. A method comprising:

associating a first keyword formed with an alphanumeric string of characters in a first written script with a semantic meaning based on any one of an analysis of:

a first contextual relevancy of a photograph bearing a visual impression of the first keyword affixed on an article of manufacture, wherein the article of manufacture is visually identified through a neural network and the photograph is verified to be an unmanipulated original of the article of manufacture on which the first keyword is affixed, a second contextual relevancy of a description of the article of manufacture on which the first keyword is alleged to be affixed, and a third contextual relevancy of a screenshot bearing the visual impression of the first keyword affixed on a web page, wherein a service offering is visually marked with the first keyword affixed, and verified to be persisting on the web page for a duration of time inclusive of a current time and date;

comparing the first keyword with a second keyword formed with the alphanumeric string of characters with a known semantic meaning as documented in a trusted authority;

applying a linguistic artificial intelligence algorithm upon the first keyword and the second keyword in a set of languages including a primary language of the first written script using a deep learning algorithm to determine which of a set of comparative rules form a basis of an arguable similarity;

training the linguistic artificial intelligence algorithm through continuous algorithm enhancement of artificial intelligence based learning from a large data set of tens of thousands of successful office action, litigation, and search string models from any one of the trusted authority and other trusted authorities and automatically drafting a proposed argument in issue, rule, application, and conclusion format to support a position on the similarity between the semantic inference of the first keyword with the second keyword.

19. The method of claim 18 further comprising generating a list of a suggested trademark classifications by applying a trademark classification determination artificial intelligence algorithm that quantifiably predicts chances of success and applicability of the first keyword to the trademark classification determination based on the associating of the first keyword formed with the alphanumeric string of characters in the first written script with the semantic meaning based on any one of an analysis described in claim 18.

20. The method of claim 18 further comprising:

generating a list of suggested goods by applying a resonance determination artificial intelligence algorithm that quantifiably predicts that the first keyword is likely to be commercially successful if applied to any of the items on the list of the suggested goods, and generating a list of suggested services by applying the resonance determination artificial intelligence algorithm that quantifiably predicts that the first keyword is likely to be commercially successful if applied to any of the items on the list of the suggested services.

* * * * *